UNITED STATES PATENT OFFICE.

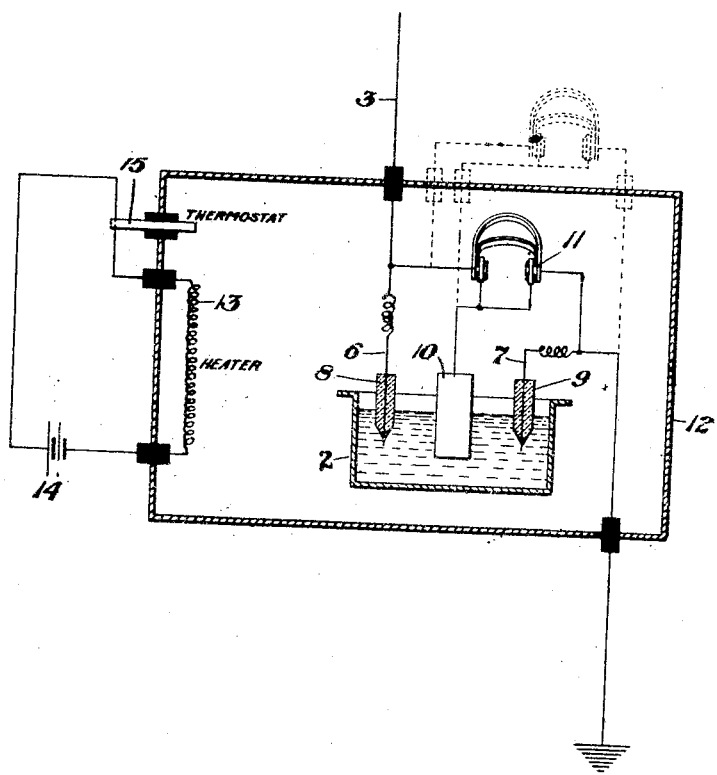

REGINALD A. FESSENDEN, OF WASHINGTON, DISTRICT OF COLUMBIA.

RECEIVER FOR ELECTROMAGNETIC WAVES.

962,016.  Specification of Letters Patent.  Patented June 21, 1910.

Application filed March 16, 1906. Serial No. 306,386.

*To all whom it may concern:*

Be it known that I, REGINALD A. FESSENDEN, a citizen of the United States, and resident of Washington, District of Columbia, have invented certain new and useful Improvements in Receivers for Electromagnetic Waves, of which the following is a specification.

The invention described herein relates to receivers for electro-magnetic waves of the liquid barretter type, especially of that class or kind which may conveniently be termed the self exciting type in which the terminals of the barretter form respectively the positive and negative elements of a cell for producing the local current.

One means commonly used for producing the voltage for the barretter is a potentiometer. Another means consists in forming the large terminal of the liquid barretter of zinc. The latter however is objectionable as hydrogen will come off at the fine point or terminal thus rendering the barretter less sensitive.

In the accompanying drawing forming a part of this specification, the figure shows in section a convenient arrangement of the cell and its mode of mounting and connections.

In the practice of my invention the fine terminals 6 and 7 are formed of Wollaston wire having its platinum core in good electrical contact with the electrolyte, as by projecting into such electrolyte, which is contained in a suitable receptacle 2. Such terminals are operatively connected in any suitable manner either directly or indirectly with the aerial 3. The other electrode 10, which is immersed in the electrolyte, may be formed of any suitable material, but preferably of a material that in the operation of the barretter, will cause the fine platinum point to have oxygen deposited thereon. For example the electrode 10 may be formed of platinum black containing occluded hydrogen or oxygen, but preferably the latter. Or the electrode 10 may be formed of copper oxid in which case caustic soda or caustic potash is preferably employed as the electrolyte. It is found by practice that with a receiver constructed in this manner, the tuning is more sharp and better results are obtained. Other materials may be employed, as for example, the electrode 10 may be formed of lead peroxid in which case twenty per cent. nitric acid or twenty per cent. sulfuric acid may be used as an electrolyte. The electrode or terminal 10 is connected to ground, and the indicating mechanism 11 as a telephone, is connected to the terminals 6, 7 and 10.

In practice I prefer to use two fine terminals, 6 and 7, formed by platinum or preferably osmium or iridium or their alloys, passing through glass points, 8 and 9. The fine terminal wire may be flush with the ends of the points or project beyond the same. These fine terminals are connected either directly or inductively to the aerial 3. The large electrode 10 which may be formed as heretofore stated is connected to ground. A double telephone 11, preferably of the head type is connected as shown to the terminals, 6, 7 and 10. 16, 16 are inductances or resistances preferably adjustable.

It has been found advisable to maintain the liquid barretter at a constant temperature, and to that end it is preferably inclosed in a box or shell 12 formed of any suitable material. If the case or shell is formed of metal, the connections leading to the aerial to ground, etc., should pass through bushings of insulating material. The temperature in the box can be kept constant by suitable cooling or heating means as for example a heating coil 13 arranged in the box and connected to a generator 14, and controlled by a thermostat 15. When the box or shell is used, the telephone may be so arranged that the indications may be heard through an opening in the box; or the telephone connection may be passed through insulating bushings locating the telephone outside as shown in dotted lines.

I claim herein as my invention:

1. A receiver for wireless telegraphy, comprising a body of electrolyte, two fine terminals in contact therewith and a larger terminal also in contact therewith, combined with circuits for passing electromagnetic waves through the electrolyte, and means for indicating resulting changes of conductivity in the electrolyte.

2. A liquid barretter having two fine terminals, a large terminal and an electrolyte.

In testimony whereof, I have hereunto set my hand and seal, the 12th day of March A. D. 1906.

REGINALD A. FESSENDEN. [L. S.]

Witnesses:
 JESSIE E. BENT,
 PHILIP POST.